United States Patent
Hirahara et al.

(10) Patent No.: US 12,266,754 B2
(45) Date of Patent: Apr. 1, 2025

(54) APPARATUS FOR MANUFACTURING ELECTRODE BODY AND METHOD FOR MANUFACTURING ELECTRODE BODY

(71) Applicants: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Yuki Hirahara, Toyohashi (JP); Masakazu Umehara, Kurokawa-gun (JP); Naohiro Ishizuka, Toyota (JP); Kou Saito, Hamamatsu (JP); Naoya Kishimoto, Nagoya (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 23 days.

(21) Appl. No.: 18/108,557

(22) Filed: Feb. 10, 2023

(65) Prior Publication Data
US 2023/0261242 A1    Aug. 17, 2023

(30) Foreign Application Priority Data
Feb. 14, 2022   (JP) ................ 2022-020550

(51) Int. Cl.
  *B05C 5/02*    (2006.01)
  *B05C 9/12*    (2006.01)
  (Continued)

(52) U.S. Cl.
  CPC ....... *H01M 10/0404* (2013.01); *B05C 5/0245* (2013.01); *B05C 5/0254* (2013.01);
  (Continued)

(58) Field of Classification Search
  None
  See application file for complete search history.

(56) References Cited

U.S. PATENT DOCUMENTS 5,474,814 A * 12/1995 Komatsu ................ G11B 5/845
5,633,050 A *  5/1997 Shibata .................. G11B 5/852
(Continued)

FOREIGN PATENT DOCUMENTS

| JP | 2003-010728 A | 1/2003 |
| JP | 2004-073944 A | 3/2004 |
| JP | 2010-135238 A | 6/2010 |

OTHER PUBLICATIONS

JP Office Action dated Mar. 12, 2024 as received in Application No. 2022-020550.

*Primary Examiner* — Binu Thomas
(74) *Attorney, Agent, or Firm* — Maschoff Brennan

(57) ABSTRACT

An apparatus for manufacturing an electrode body includes a coater and an attraction magnet. The coater applies a mixture paste including an electrode active material to a substrate that is configured to be a current collector. The attraction magnet is opposed to an applied layer of the mixture paste formed on the substrate so that when the mixture paste contains a metal object, the attraction magnet attracts the metal object so as to change a shape of a surface of the applied layer.

7 Claims, 3 Drawing Sheets

(51) Int. Cl.
*H01M 4/04* (2006.01)
*H01M 4/139* (2010.01)
*H01M 10/04* (2006.01)
*H01M 10/0525* (2010.01)

(52) U.S. Cl.
CPC ............. *B05C 9/12* (2013.01); *H01M 4/04* (2013.01); *H01M 4/0404* (2013.01); *H01M 4/139* (2013.01); *H01M 10/0525* (2013.01)

(56) References Cited

U.S. PATENT DOCUMENTS

| | | | | |
|---|---|---|---|---|
| 5,641,355 | A * | 6/1997 | Munch | G11B 5/848 |
| | | | | 118/410 |
| 5,976,254 | A * | 11/1999 | Hikichi | B05C 5/0254 |
| | | | | 118/410 |
| 6,235,368 | B1 * | 5/2001 | Wiegemann | G11B 5/852 |
| 2004/0173148 | A1 * | 9/2004 | Kim | B05C 5/0254 |
| | | | | 118/313 |

* cited by examiner

APPARATUS FOR MANUFACTURING ELECTRODE BODY AND METHOD FOR MANUFACTURING ELECTRODE BODY

CROSS-REFERENCE TO RELATED APPLICATION

This application is based upon and claims the benefit of priority from prior Japanese Patent Application No. 2022-020550, filed on Feb. 14, 2022, the entire contents of which are incorporated herein by reference.

BACKGROUND

1. Field

The following description relates to an apparatus for manufacturing an electrode body and a method for manufacturing an electrode body.

2. Description of Related Art

In an example, an electrode body is included in a lithium-ion rechargeable battery. The electrode body may be formed by applying a mixture paste including an electrode active material to a substrate, which is configured to be a current collector. Japanese Laid-Open Patent Publication Nos. 2003-10728 and 2004-73944 each disclose an example of a method for removing a metal object, when contained in the mixture paste, from the mixture paste using a magnet.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In the field of battery manufacturing, there is always a need for further improvement in quality and efficiency. The conventional configurations described above may not satisfy the advancing need standard.

An aspect of the present disclosure is an apparatus for manufacturing an electrode body that includes a coater and an attraction magnet. The coater applies a mixture paste including an electrode active material to a substrate that is configured to be a current collector. The attraction magnet is opposed to an applied layer of the mixture paste formed on the substrate so that when the mixture paste contains a metal object, the attraction magnet attracts the metal object so as to change a shape of a surface of the applied layer.

The apparatus described above may be configured to attract the metal object with the attraction magnet so that the metal object forms a protrusion on the surface of the applied layer.

In the apparatus described above, when the attraction magnet attracts the metal object having a length of 50 μm or greater, the apparatus may be configured to change the shape of the surface of the applied layer.

The apparatus described above may further include a visual inspection device that detects a change in the shape of the surface of the applied layer.

The apparatus described above may further include a discharge slot arranged on the coater to discharge the mixture paste and a collection magnet arranged on the discharge slot to collect a metal object contained in the mixture paste.

Another aspect of the present disclosure is an apparatus for manufacturing an electrode body that includes a coater, a discharge slot, and a collection magnet. The coater applies a mixture paste including an electrode active material to a substrate that is configured to be a current collector. The discharge slot is arranged on the coater to discharge the mixture paste. The collection magnet is arranged on the discharge slot to collect a metal object contained in the mixture paste.

In the apparatus described above, the collection magnet may be arranged at a downstream side of the discharge slot in a transportation direction of the substrate that is continuously transported.

In the apparatus described above, the applied layer of the mixture paste formed on the substrate may have a thickness that is greater than or equal to 20 μm and less than or equal to 50 μm.

Another aspect of the present disclosure is a method for manufacturing an electrode body. The method includes applying a mixture paste including an electrode active material to a substrate that is configured to be a current collector, and with an attraction magnet opposed to an applied layer of the mixture paste formed on the substrate, attracting a metal object contained in the mixture paste so as to change a shape of a surface of the applied layer.

The method described above may further include collecting a metal object contained in the mixture paste with a collection magnet arranged on a discharge slot that discharges the mixture paste toward the substrate.

Another aspect of the present disclosure is a method for manufacturing an electrode body. The method includes applying a mixture paste including an electrode active material to a substrate that is configured to be a current collector, and collecting a metal object contained in the mixture paste with a collection magnet arranged on a discharge slot that discharges the mixture paste toward the substrate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of an apparatus for manufacturing an electrode body and a method for manufacturing an electrode body will be described below with reference to the drawings.

Figure 1:
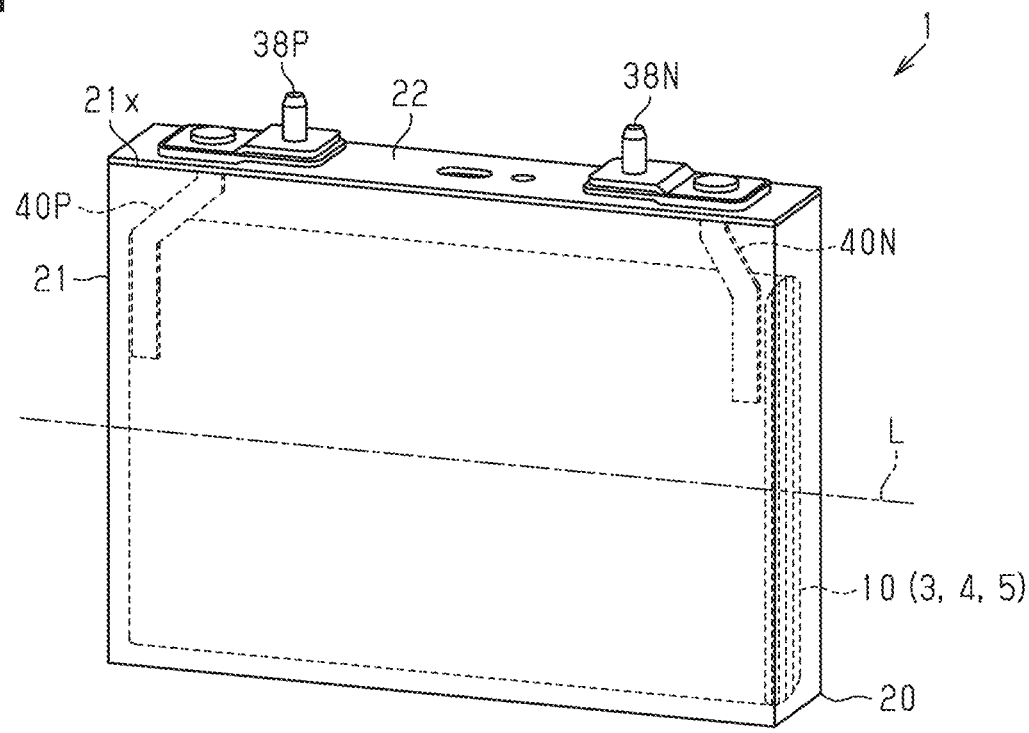
FIG. 1 is a perspective view of a rechargeable battery.

As shown in FIG. 1, a rechargeable battery 1 includes an electrode body 10, which integrates a positive electrode 3, a negative electrode 4, and a separator 5, and a case 20 accommodating the electrode body 10. The rechargeable battery 1 of the present embodiment is a lithium-ion rechargeable battery in which the electrode body 10 is impregnated with a nonaqueous electrolyte in the case 20.

Specifically, in the rechargeable battery 1 of the present embodiment, the positive electrode 3, the negative electrode 4, and the separator 5 are sheet-shaped and are laminated with each other. The lamination of the positive electrode 3, the negative electrode 4, and the separator 5 is rolled to form the electrode body 10 in which when the separator 5 is sandwiched between the positive electrode 3 and the negative electrode 4, the positive electrode 3 and the negative electrode 4 alternate with the separator 5 in the radial direction.

In the present embodiment, the case 20 includes a case body 21 and a lid 22. The case body 21 is low-profile-rectangular-box-shaped and includes an open end 21x. The lid 22 seals the open end 21x of the case body 21. In the present embodiment, the electrode body 10 has a low-profile shape corresponding to the box-shaped case 20

Figure 2:
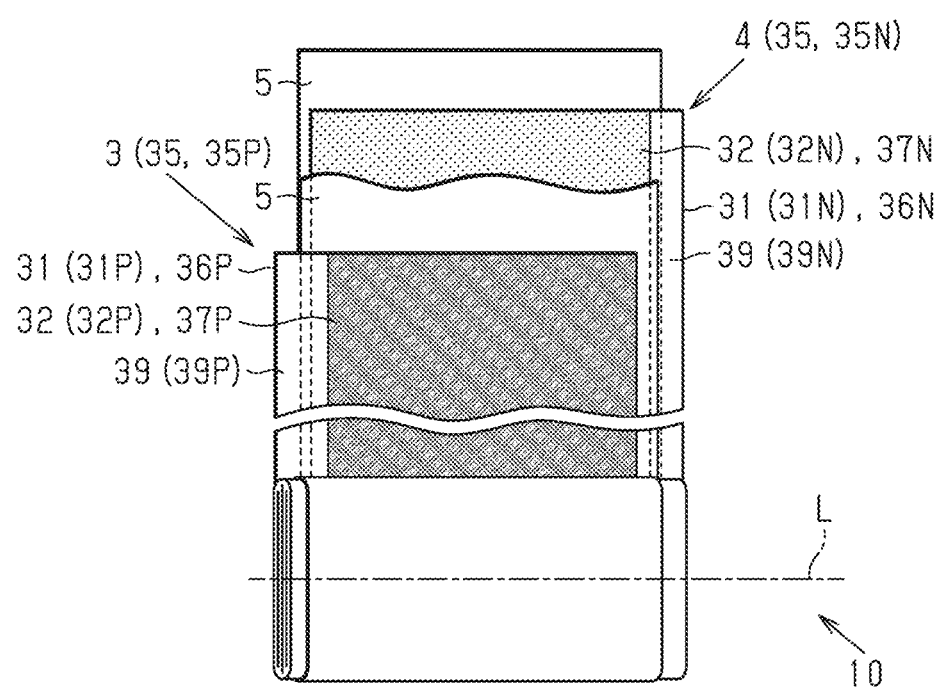
FIG. 2 is an exploded view of an electrode body.

More specifically, as shown in FIG. 2, in the rechargeable battery 1 of the present embodiment, the positive electrode 3 and the negative electrode 4 each include an electrode sheet 35. The electrode sheet 35 includes a sheet of current collector 31 and an electrode active material layer 32 formed on the current collector 31.

Specifically, in an electrode sheet 35P for the positive electrode 3, a mixture paste 37P includes lithium-transition metal oxide as a positive active material, and a substrate 36P includes aluminum or the like as a material to form a positive current collector 31P. The mixture paste 37P is applied to the substrate 36P. Also, in an electrode sheet 35N for the negative electrode 4, a mixture paste 37N includes a carbon-based material as a negative active material, and a substrate 36N includes copper or the like to form a negative current collector 31N. The mixture paste 37N is applied to the substrate 36N. The mixture pastes 37P and 37N each contain a binder. In the rechargeable battery 1 of the present embodiment, when the mixture pastes 37P and 37N are dried, a positive active material layer 32P and a negative active material layer 32N are formed on the positive electrode sheet 35P and the negative electrode sheet 35N, respectively.

In the rechargeable battery 1 of the present embodiment, the positive electrode sheet 35P and the negative electrode sheet 35N are each belt-shaped. In the electrode body 10 of the present embodiment, the positive electrode sheet 35P and the negative electrode sheet 35N, between which the separator 5 is sandwiched, are laminated and rolled about a roll axis L that extends in the width-wise direction (sideward direction in FIG. 2) of the belt-shaped sheets.

In FIG. 2, when the electrode sheet 35P, which forms the positive electrode 3, is located inward, the separator 5 and the electrode sheets 35 are rolled. The structure of the electrode body 10 shown in FIG. 2 is an example. Alternatively, when the electrode sheet 35N, which forms the negative electrode 4, is located inward, the separator 5 and the electrode sheets 35 may be rolled. This determines whether the electrode sheet 35 located at the outermost shell of the electrode body 10 is defined by the electrode sheet 35P, forming the positive electrode 3, or the electrode sheet 35N, forming the negative electrode 4.

Figure 3:
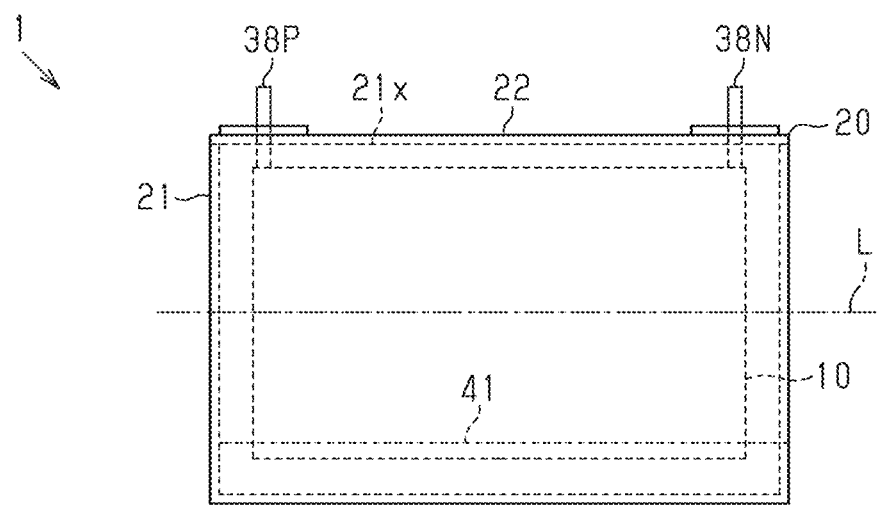
FIG. 3 is a side view of the rechargeable battery.

As shown in FIGS. 1 to 3, the lid 22 of the case 20 is provided with a positive terminal 38P and a negative terminal 38N projecting outward from the case 20. Each electrode sheet 35 also includes a non-applied portion 39, that is, a portion of the current collector 31 that is free of the electrode active material layer 32. In the rechargeable battery 1 of the present embodiment, the non-applied portions 39 are used to electrically connect the electrode sheet 35P, forming the positive electrode 3, to the positive terminal 38P and the electrode sheet 35N, forming the negative electrode 4, to the negative terminal 38N, respectively.

More specifically, in the present embodiment, the lid 22 is rectangular-plate-shaped. When the roll axis L extends in the longitudinal direction (sideward direction in FIG. 1) of the lid 22, the electrode body 10 is accommodated in the case 20. In this state, the non-applied portion 39P of the electrode sheet 35P, which forms the positive electrode 3, is connected to the positive terminal 38P by a connection member 40P. In the same manner, the non-applied portion 39N of the electrode sheet 35N, forming the negative electrode 4, is connected to the negative terminal 38N by a connection member 40N.

An electrolytic solution 41 is added to the case 20. More specifically, in the present embodiment, the electrolytic solution 41 of the rechargeable battery 1, which is a lithium-ion rechargeable battery, is a solution obtained by dissolving a lithium salt serving as a supporting salt in an organic solvent. Thus, in the rechargeable battery 1 of the present embodiment, the electrode body 10, which is sealed in the case 20, is impregnated with the electrolytic solution 41.

Apparatus and Method for Manufacturing Electrode Sheet

An apparatus and a method for manufacturing the electrode body 10 of the rechargeable battery 1 having the structure described above, more specifically, the electrode sheet 35 used to form the electrode body 10, will now be described.

Figure 4:
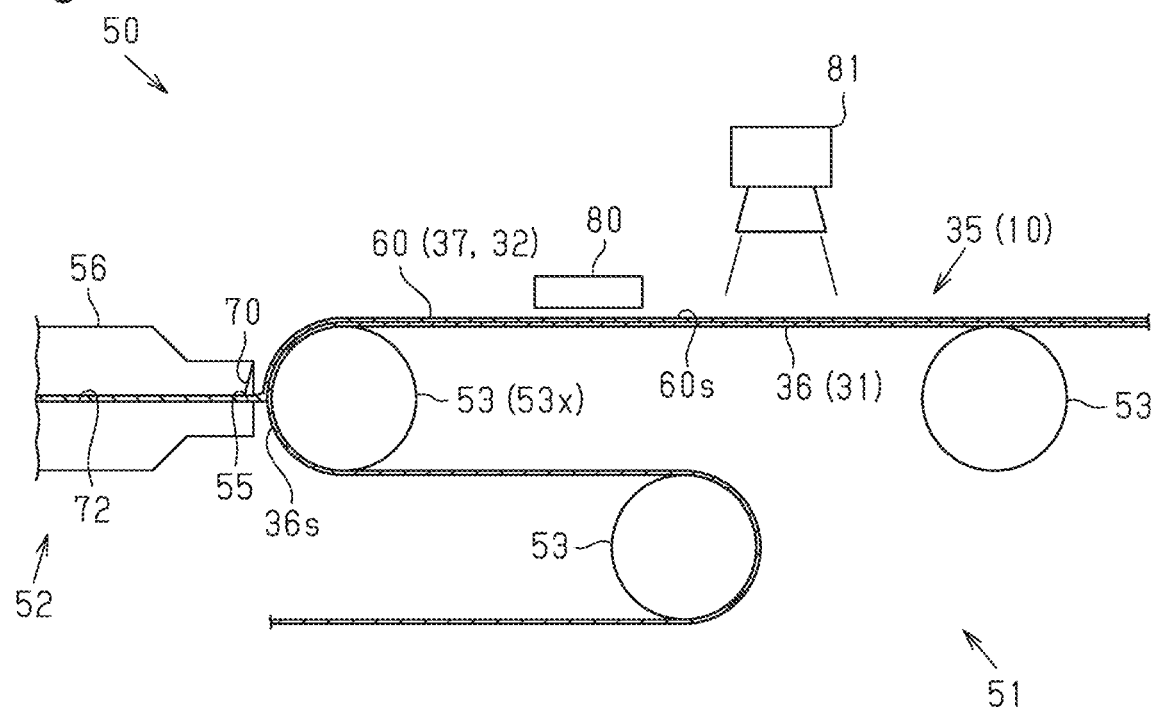
FIG. 4 is a schematic diagram of a manufacturing apparatus used to manufacture the electrode body.

As shown in FIG. 4, an apparatus 50 for manufacturing the electrode sheet 35 used to form the electrode body 10 includes a conveyor 51 that continuously transports a substrate 36, which is configured to be the current collector 31, and a coater 52 that applies a mixture paste 37 to a surface 36s of the substrate 36.

More specifically, in the present embodiment, the substrate 36 has the form of a belt-shaped foil. The substrate 36 is referred to as "the current collector foil" because of its shape and the functionality as the current collector 31. In the manufacturing apparatus 50 of the present embodiment, the conveyor 51 includes rolls 53, on which the substrate 36 runs. In the present embodiment, the conveyor 51 is configured to rotate the rolls 53 and continuously transport the belt-shaped substrate 36.

In the present embodiment, the coater 52 includes a coating die 56 including a discharge slot 55 that discharges the mixture paste 37 toward the substrate 36. More specifically, in the manufacturing apparatus 50 of the present embodiment, the coating die 56 is arranged at a radially outer side of a roll 53x, which is one of the rolls 53 of the conveyor 51 that is referred to as "the B roll". Thus, in the present embodiment, the coater 52 is configured to continuously apply the mixture paste 37, which is discharged from the discharge slot 55, to the surface 36s of the substrate 36, which is opposed to the coating die 56.

More specifically, in the present embodiment, when the manufacturing apparatus 50 performs the series of steps described above, the mixture paste 37 forms an applied layer 60, which is configured to be the electrode active material layer 32, on the substrate 36. In an example, the thickness of the applied layer 60 is set to approximately 30 μm. After the applied layer 60 is dried, the electrode sheet 35, which is formed by applying the mixture paste 37 to the substrate 36, is sequentially cut to have a predetermined length and a predetermined width. The positive electrode sheet 35P and the negative electrode sheet 35N, which have been shaped as described above, are rolled with the separator 5 to form the electrode body 10 (refer to FIG. 2).

Metal Object Collection Magnet

A metal object collection magnet is included in the manufacturing apparatus 50 of the present embodiment and will be now be described.

Figure 5:
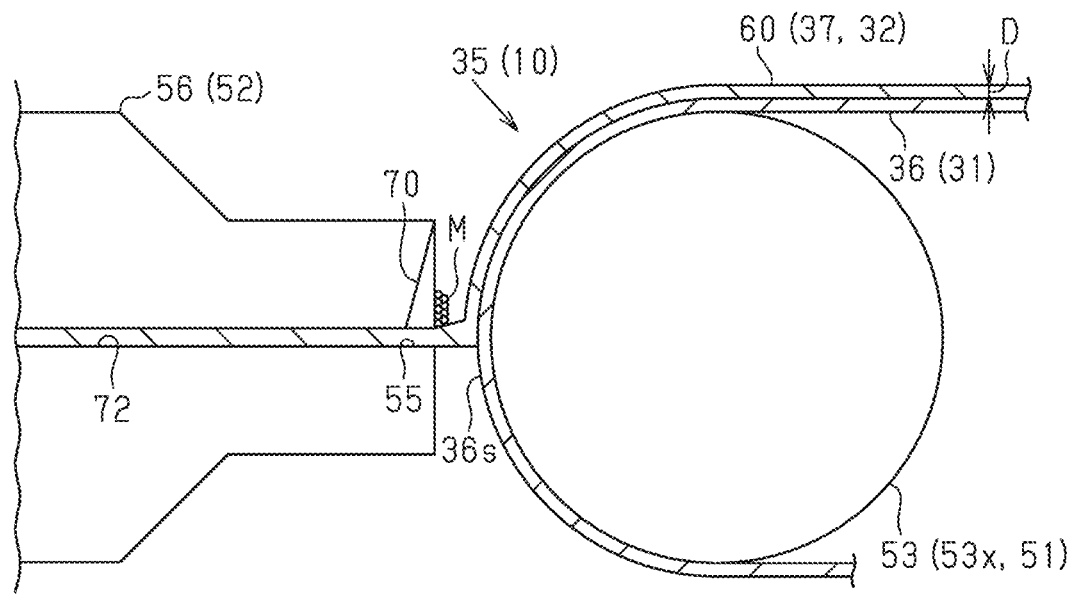
FIG. 5 is a diagram of a collection magnet arranged on a discharge slot that discharges a mixture paste.

As shown in FIGS. 4 and 5, in the manufacturing apparatus 50 of the present embodiment, the coating die 56 of the coater 52 includes a collection magnet 70. In an example, the collection magnet 70 is arranged on the discharge slot 55 formed in the distal end of the coating die 56 to discharge the mixture paste 37. In the manufacturing apparatus 50 of the present embodiment, the collection magnet 70 collects a metal object M that is contained in the mixture paste 37 when applied to the substrate 36 through the discharge slot 55. Thus, the manufacturing apparatus 50 of the present embodiment efficiently removes the metal object M from the mixture paste 37.

More specifically, in the manufacturing apparatus 50 of the present embodiment, the collection magnet 70 is elongated to extend over the substantially entire range of the substrate 36, having the form of a belt-shaped foil, in the width-wise direction (direction orthogonal to the plane of FIG. 4) when the substrate 36 is continuously transported by the conveyor 51. The collection magnet 70 is arranged on the discharge slot 55 of the mixture paste 37 at a downstream side (upper side in FIGS. 4 and 5) in the transportation direction of the substrate 36. In other words, in the transportation direction of the substrate 36, the collection magnet 70 is arranged at a downstream side of the discharge slot 55 for the mixture paste 37. In other words, the collection magnet 70 is arranged on the discharge slot 55 at a position in a forward direction of the substrate 36 that is running on the roll 53x opposed to the coating die 56 of the coater 52. Thus, the manufacturing apparatus 50 of the present embodiment efficiently uses magnetic force to collect the metal object M on the collection magnet 70 from the mixture paste 37.

More specifically, the mixture paste 37 moves through a passage 72 of the coater 52 and exits from the discharge slot 55, at which the mixture paste 37 is spread and reduced in thickness in accordance with a thickness D of the applied layer 60 formed on the substrate 36. In addition, the discharging pressure of the mixture paste 37 increases the flow rate of the mixture paste 37. This exerts a high shearing force to decrease the viscosity of the mixture paste 37 to, for example, approximately 1500 mPa·s (millipascal-second). Thus, in the manufacturing apparatus 50 of the present embodiment, the collection magnet 70 readily captures the metal object M from the mixture paste 37.

In the present embodiment, the manufacturing apparatus 50 is further configured so that after the mixture paste 37 is applied, the substrate 36 is separated from the collection magnet 70, which is arranged on the discharge slot 55 for the mixture paste 37, in the discharging direction of the mixture paste 37 in accordance with the cylindrical shape of the roll 53x opposed to the coating die 56. Thus, when the metal object M is collected on the collection magnet 70, the manufacturing apparatus 50 of the present embodiment limits collection of the metal object M back on the mixture paste 37 applied to the substrate 36.

When the metal object M is captured by the collection magnet 70, the manufacturing apparatus 50 of the present embodiment is further configured to wipe off the metal object M at the outside of the coating die 56, which includes the discharge slot 55 for the mixture paste 37. Thus, the manufacturing apparatus 50 of the present embodiment readily and simply removes the metal object M from the mixture paste 37.

Metal Object Attraction Magnet

A metal object attraction magnet is included in the manufacturing apparatus 50 of the present embodiment and will be now described.

As shown in FIG. 4, in addition to the collection magnet 70 arranged on the discharge slot 55 for the mixture paste 37 as described above, the manufacturing apparatus 50 of the present embodiment further includes an attraction magnet 80 that is opposed to the applied layer 60 of the mixture paste 37 formed on the substrate 36. More specifically, the attraction magnet 80 is arranged at a downstream side (right side in FIG. 4) of the application position, where the coating die 56 is arranged to apply the mixture paste 37 to the substrate 36, in the transportation direction of the substrate 36, which is continuously transported by the conveyor 51. In other words, the attraction magnet 80 is arranged in the transportation path of the substrate 36 at a downstream side of the application position of the mixture paste 37, which is applied to the substrate 36 by the coating die 56, in the transportation direction of the substrate 36. More specifically, the attraction magnet 80 is opposed to the applied layer 60 and spaced apart from a surface 60s of the applied layer 60 formed on the substrate 36 by approximately a few mm. In the same manner as the collection magnet 70, the attraction magnet 80 is elongated to extend over the entire width-wise range of the substrate 36, which has the form of a belt-shaped foil and is continuously transported by the conveyor 51. The manufacturing apparatus 50 of the present embodiment further includes a visual inspection device 81 arranged at a downstream side of the attraction magnet 80 in the transportation direction. The manufacturing apparatus 50 of the present embodiment efficiently removes the metal object M from the mixture paste 37 based on an inspection result of the visual inspection device 81.

More specifically, the manufacturing apparatus 50 of the present embodiment attracts the metal object M contained in the applied layer 60 of the mixture paste 37 with a magnetic force of the attraction magnet 80. Movement of the metal object M attracted by the attraction magnet 80 changes the shape of the surface of the applied layer 60 formed on the substrate 36. The manufacturing apparatus 50 of the present embodiment is configured to detect the change in the shape of the surface 60s of the applied layer 60 with the visual inspection device 81 arranged at the downstream side of the attraction magnet 80.

Figure 6:
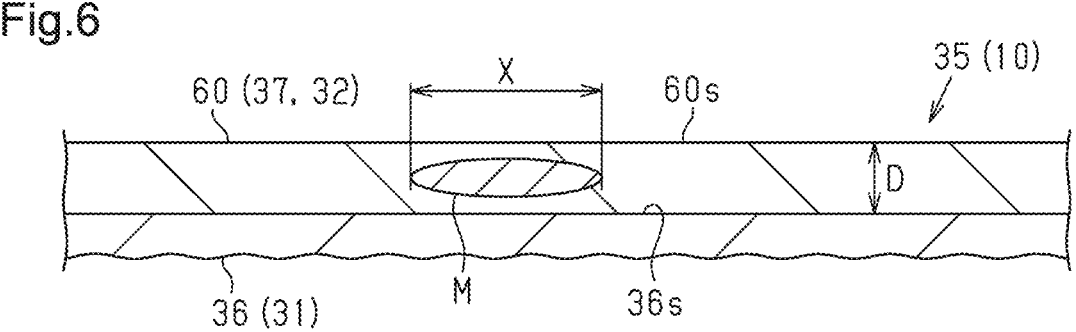
FIG. 6 is a diagram of a metal object contained in an applied layer of the mixture paste.
Figure 7:
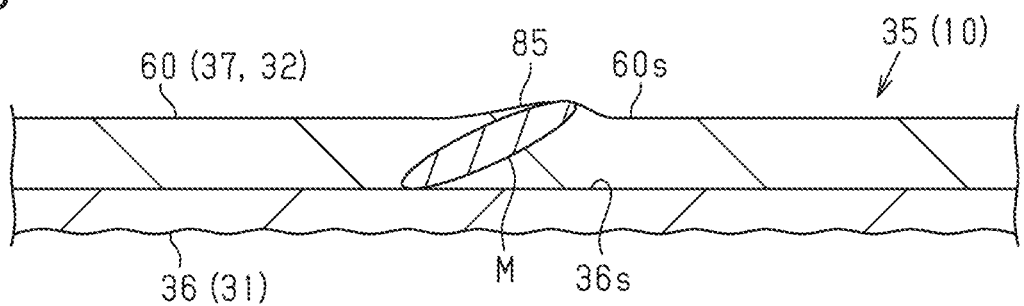
FIG. 7 is a diagram of the metal object attracted to the attraction magnet and a change in the shape of the surface of the applied layer.

More specifically, as shown in FIGS. 6 and 7, in the manufacturing apparatus 50 of the present embodiment, when the attraction magnet 80 attracts the metal object M contained in the applied layer 60 of the mixture paste 37, for example, the position of the metal object M changes.

More specifically, the applied layer 60 of the mixture paste 37 may contain a metal object M having the form of an elongated grain having a length X greater than the thickness D of the applied layer 60 (X>D). In this case, the position of the metal object M is likely to be such that the longitudinal direction of the metal object M extends along the surface 36s of the substrate 36. That is, the metal object M is likely to be "in a lying state." In the manufacturing apparatus 50 of the present embodiment, when the attraction magnet 80 attracts the metal object M that is "in the lying state", the position of the metal object M changes to "a standing state." In other words, the position of the metal object M contained in the applied layer 60 of the mixture paste 37 changes so that the longitudinal direction of the metal object M conforms to the thickness-wise direction of the applied layer 60. As a result, with the manufacturing apparatus 50 of the present embodiment, the metal object M attracted by the attraction magnet 80 forms a protrusion 85 on the surface 60s of the applied layer 60.

More specifically, when the attraction magnet 80 attracts a metal object M having the length X of, for example, 50 μm or greater, the manufacturing apparatus 50 of the present embodiment is configured to change the shape of the surface of the applied layer 60 in a portion including the metal object M. In addition, when the visual inspection device 81 detects such a change in the shape of the surface 60s of the applied layer 60, the manufacturing apparatus 50 of the present embodiment performs marking on the portion from which the change in the shape of the surface is detected. When rolling the electrode sheet 35 to form the electrode body 10 as described above, the manufacturing apparatus 50 of the present embodiment avoids the use of the marked portion. Thus, the metal object M is efficiently removed from the mixture paste 37.

The collection magnet 70, which is arranged on the discharge slot 55 for the mixture paste 37, may fail to completely capture the metal object M from the mixture paste 37. In this regard, the manufacturing apparatus 50 of the present embodiment also uses a process for removing the metal object M with the attraction magnet 80 such as that described above. This further improves quality.

The manufacturing apparatus 50 of the present embodiment further includes a filter (not shown) arranged in the passage 72 of the mixture paste 37 formed in the coater 52 to capture the metal object M from the mixture paste 37. However, the shape of the metal object M is not always spherical and often indefinite such as the shape of an elongated grain as described above. Hence, the metal object M may pass through the filter depending on the position in the mixture paste 37. The manufacturing apparatus 50 of the present embodiment is configured to use the collection magnet 70 and the attraction magnet 80 to remove the metal object M, which has passed through the filter.

The operation of the present embodiment will now be described.

In the manufacturing apparatus 50 of the present embodiment, the metal object M contained in the mixture paste 37 applied to the substrate 36 is collected and captured by the collection magnet 70 arranged on the discharge slot 55 for the mixture paste 37. When the metal object M is not collected on the collection magnet 70 and remains in the mixture paste 37 applied to the substrate 36, the metal object M is attracted by the attraction magnet 80, which is opposed to the applied layer 60 of the mixture paste 37 formed on the substrate 36. The metal object M is removed from the applied layer 60 of the mixture paste 37 based on a change in the shape of the surface 60s of the applied layer 60 resulting from the attraction of the metal object M by the attraction magnet 80.

The advantages of the present embodiment will now be described.

(1) The manufacturing apparatus 50 of the electrode body 10 includes the coater 52. The coater 52 applies the mixture paste 37 including the electrode active material to the substrate 36, which is configured to be the current collector 31. The manufacturing apparatus 50 further includes the attraction magnet 80, which is opposed to the applied layer 60 of the mixture paste 37 formed on the substrate 36. The manufacturing apparatus 50 is configured to change the shape of the surface of the applied layer 60 as a result of attraction of the metal object M from the mixture paste 37 by the attraction magnet 80.

This structure allows the detection of the metal object M contained in the applied layer 60 of the mixture paste 37 formed on the substrate 36 and specifies the portion containing the metal object M. This efficiently removes the metal object M, thereby ensuring a high quality.

In particular, the attraction magnet 80 is not in contact with the mixture paste 37 and does not collect the metal object M. This eliminates the need for frequent cleaning and simplifies the cleaning. Thus, the efficiency is further increased.

(2) The manufacturing apparatus 50 is configured to attract the metal object M from the mixture paste 37 with the attraction magnet 80 so that the metal object M forms the protrusion 85 on the surface 60s of the applied layer 60. Thus, the portion containing the metal object M is readily specified.

(3) The manufacturing apparatus 50 is configured to change the shape of the surface of the applied layer 60 when the attraction magnet 80 attracts the metal object M having the length X of 50 μm or greater. Thus, the metal object M having a great effect on the battery property is efficiently removed.

(4) The manufacturing apparatus 50 includes the visual inspection device 81, which detects a change in the shape of the surface of the applied layer 60 of the mixture paste 37. This automates the detection of the metal object M contained in the applied layer 60 of the mixture paste 37 and the specifying of the portion containing the metal object M based on a change in the shape of the surface.

(5) The manufacturing apparatus 50 includes the collection magnet 70 that collects the metal object M from the mixture paste 37 at the discharge slot 55, which is arranged in the coater 52 to discharge the mixture paste 37.

At the discharge slot 55 for the mixture paste 37, the mixture paste 37 is spread and reduced in thickness in accordance with the thickness D of the applied layer 60 formed on the substrate 36. In addition, the discharging pressure increases the flow rate of the mixture paste 37 and exerts a high shearing force. This decreases the viscosity of the mixture paste 37. Thus, the metal object M is efficiently collected and captured from the mixture paste 37 by the magnetic force of the collection magnet 70.

Furthermore, the metal object M is readily wiped off from the collection magnet 70. Thus, the metal object M is readily and simply removed from the mixture paste 37.

(6) The collection magnet 70 is arranged on the discharge slot 55 for the mixture paste 37 at a downstream side in the transportation direction of the substrate 36, which is continuously transported. Thus, the collection magnet 70 further efficiently collects and captures the metal object M from the mixture paste 37.

The above embodiment may be modified as described below. The embodiment and the following modified examples may be combined as long as the combined modified examples remain technically consistent with each other.

In the present embodiment, the collection magnet 70 is arranged at a downstream side of the discharge slot 55 for the mixture paste 37 in the transportation direction of the substrate 36, which is continuously transported. However, the arrangement of the collection magnet 70 on the discharge slot 55 for the mixture paste 37 may be changed in any manner. In an example, the collection magnet 70 may be arranged at an upstream side of the discharge slot 55 for the mixture paste 37 in the transportation direction of the substrate 36. In another example, collection magnets 70 may be arranged at both the upstream side and the downstream side in the transportation direction of the substrate 36.

In the present embodiment, the collection magnet 70 is elongated to extend over the entire width-wise range of the substrate 36, which has the form of a belt-shaped foil and is continuously transported by the conveyor 51. However, the shape of the collection magnet 70 may be changed in any manner. In an example, the collection magnet 70 may include multiple pieces of collection magnets 70.

The shape and the layout of the attraction magnet 80 may be changed in any manner. The attraction magnet 80 may have any shape and any layout as long as the attraction magnet 80 is opposed to the applied layer 60 of the mixture paste 37 formed on the substrate 36 so as to attract the metal object M contained in the mixture paste 37 and change the shape of the surface of the applied layer 60. In an example, the attraction magnet 80 may include multiple pieces of attraction magnets 80. In another example, the attraction magnet 80 may be configured to be opposed to the applied layer 60 and perform a sweep action. More specifically, the attraction magnet 80 may be movable and reciprocate in the width-wise direction of the belt-shaped the substrate 36. The magnetic force of the attraction magnet 80 may also be changed in any manner.

In the present embodiment, the protrusion 85 is formed on the surface 60s of the applied layer 60 as a result of a change in the position of the metal object M contained in the mixture paste 37. This is an example of a change in the shape of the surface 60s of the applied layer 60 resulting from attraction of the metal object M by the attraction magnet 80. However, any change in the shape of the surface may be applicable as long as a change in the shape of the surface 60s of the applied layer 60 is detected as a result of movement of the metal object M in the mixture paste 37 attracted by the attraction magnet 80. In an example, when a recess is formed as a result of movement of the metal object M in the mixture paste 37 attracted by the attraction magnet 80, the change in the shape of the surface may be detected by the visual inspection device 81.

The configuration of the visual inspection device 81 may be changed in any manner. In the embodiment, instead of using the visual inspection device 81, an inspector may perform a visual inspection for a change in the shape of the surface 60s of the applied layer 60, that is, an anomaly in the electrode sheet 35.

In the present embodiment, the thickness D of the applied layer 60 is set to approximately 30 μm. However, instead, the thickness D of the applied layer 60 may be set to, for example, a range from 20 μm to 50 μm. Thus, the metal object M is efficiently removed from the mixture paste 37 using magnetic means.

In the present embodiment, the manufacturing apparatus 50 of the electrode body 10 includes the collection magnet 70 and the attraction magnet 80. However, in another embodiment, one of the collection magnet 70 and the attraction magnet 80 may be used to remove the metal object M from the mixture paste 37.

In the present embodiment, the conveyor 51 rotates the rolls 53, on which the belt-shaped substrate 36 runs, to continuously transport the substrate 36. However, the structure of the conveyor 51 may be changed in any manner.

The shapes of the positive terminal 38P and the negative terminal 38N are not limited to those shown in FIG. 1 and may be changed in any manner. The shape of the case 20, which defines the outer shape of the rechargeable battery 1, is not limited to a low-profile rectangular box and may be changed in any manner, for example, to a cylinder.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An apparatus for manufacturing an electrode body, the apparatus comprising:
   a coater that applies a mixture paste including an electrode active material to a substrate that is configured to be a current collector;
   a discharge slot arranged on the coater to discharge the mixture paste;
   a collection magnet arranged on the discharge slot to remove and collect a metal object contained in the applied mixture paste from the applied mixture paste, wherein the collection magnet is opposed to an applied layer of the mixture paste formed on the substrate, and the collection magnet is arranged at a downstream side of the discharge slot in a transportation direction of the substrate that is continuously transported; and
   an attraction magnet opposed to the applied layer of the mixture paste formed on the substrate and configured to attract a metal object that is not collected by the collection magnet so that when the mixture paste contains the metal object that is not collected by the collection magnet, the attraction magnet attracts the metal object that is not collected by the collection magnet so as to change a shape of a surface of the applied layer.

2. The apparatus according to claim 1, wherein the apparatus is configured to attract the metal object that is not collected by the collection magnet with the attraction magnet so that the metal object that is not collected by the collection magnet forms a protrusion on the surface of the applied layer.

3. The apparatus according to claim 1, wherein when the attraction magnet attracts the metal object that is not collected by the collection magnet having a length of 50 μm or greater, the apparatus is configured to change the shape of the surface of the applied layer.

4. The apparatus according to claim 1, further comprising: a visual inspection device that detects a change in the shape of the surface of the applied layer.

5. The apparatus according to claim 1, wherein the applied layer of the mixture paste formed on the substrate has a thickness that is greater than or equal to 20 μm and less than or equal to 50 μm.

6. An apparatus for manufacturing an electrode body, the apparatus comprising:
- a coater that applies a mixture paste including an electrode active material to a substrate that is configured to be a current collector;
- a discharge slot arranged on the coater to discharge the mixture paste; and
- a collection magnet arranged on the discharge slot to remove and collect a metal object contained in the applied mixture paste from the applied mixture paste,
- wherein the collection magnet is opposed to an applied layer of the mixture paste formed on the substrate, and the collection magnet is arranged at a downstream side of the discharge slot in a transportation direction of the substrate that is continuously transported.

7. The apparatus according to claim 6, wherein the applied layer of the mixture paste formed on the substrate has a thickness that is greater than or equal to 20 μm and less than or equal to 50 μm.

\* \* \* \* \*